J. N. STONER.
MOVABLE HEADLIGHT.
APPLICATION FILED APR. 25, 1913.
1,090,761.
Patented Mar. 17, 1914.
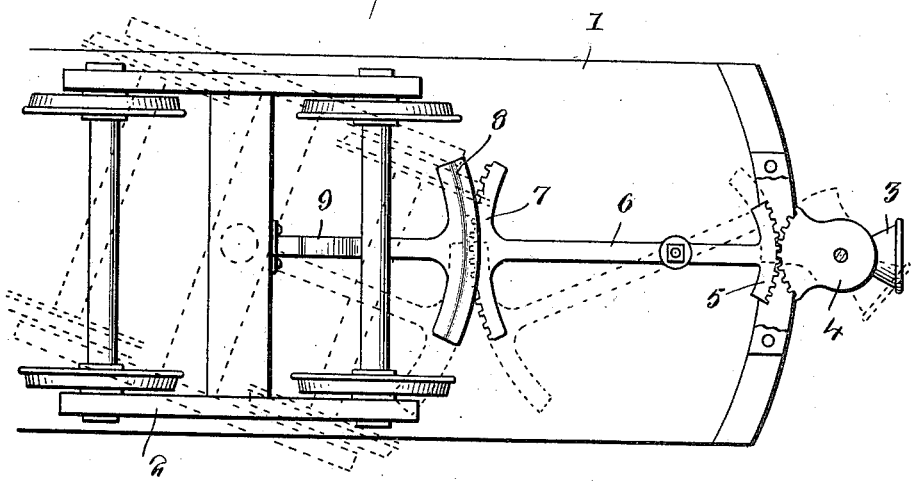
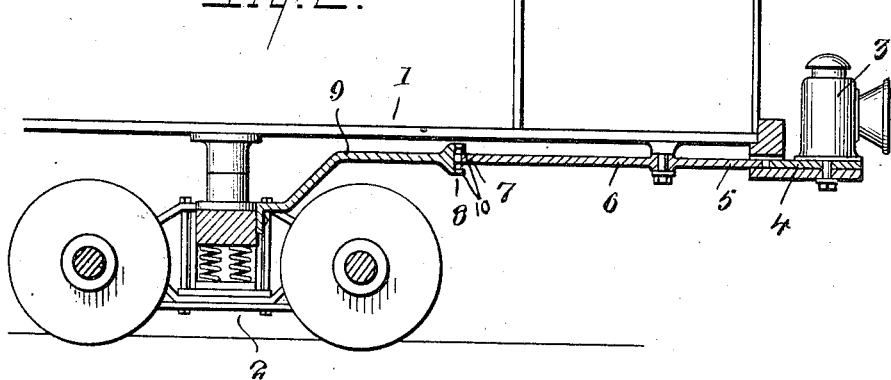
Witnesses
E. P. Ruppert
V. B. Hillyard
Inventor
Jordan N. Stoner
By Victor J. Evans
Attorney
COLUMBIA PLANOGRAPH CO., WASHINGTON, D. C.

UNITED STATES PATENT OFFICE.

JORDAN N. STONER, OF SCOTTDALE, PENNSYLVANIA.

MOVABLE HEADLIGHT.

1,090,761.  Specification of Letters Patent.  Patented Mar. 17, 1914.

Application filed April 25, 1913. Serial No. 763,611.

*To all whom it may concern:*

Be it known that I, JORDAN N. STONER, a citizen of the United States, residing at Scottdale, in the county of Westmoreland and State of Pennsylvania, have invented new and useful Improvements in Movable Headlights, of which the following is a specification.

The invention provides a headlight for vehicles in general but which is particularly adapted for railway cars, said headlight being of the type mounted to move automatically so as to throw the beams of light in the path of the vehicle whether the same is going straight ahead or rounding a curve.

The invention provides novel actuating means between the headlight and a truck of the car, whereby a turning of such truck when rounding a curve effects a corresponding movement of the headlight to throw the light around such curve so as to illuminate the road bed in advance of the car, thereby avoiding any fatality which would be liable to occur by reason of darkness, which would prevent a person from observing the approaching car or the operator of the car from seeing a pedestrian or obstruction on the track.

The invention consists of the novel features, details of construction and combination of parts, which hereinafter will be more particularly set forth, illustrated in the accompanying drawing, and pointed out in the appended claim.

Referring to the drawing, forming a part of the specification, Figure 1 is a view of an end portion of a car as seen from the under side provided with a headlight embodying the invention, the full lines showing the position of the parts when the light is thrown straight ahead and the dotted lines indicating an angular position of the headlight when the same is turned to throw the beams of light around a curve. Fig. 2 is a longitudinal section on the line *x—x* of Fig. 1, the headlight and connecting means being shown in full lines.

The numeral 1 designates a car body which may be of any design. The truck 2 is connected with the car body so as to turn about a vertical axis. The headlight 3 may be of any design and is centrally located and is mounted to turn about a vertical axis. A gear element 4 is connected with the headlight and is toothed to mesh with a toothed segment 5 at the front end of a lever 6, which is pivoted between its ends to the car body. A toothed segment 7 provided at the rear end of the lever 6 meshes with a toothed segment 8 connected with the truck 2. The lever 6 has a longitudinal and horizontal arrangement and is pivoted near its front end so as to reduce the leverage. The toothed segment 8 is formed at the front end of an arm 9 which is attached at its rear end to the truck 2. Flanges 10 form a part of the segment 8 and are arranged above and below the toothed portion thereof and embrace opposite sides of the segment 7. This arrangement holds the two segments 7 and 8 in mesh at all times when the car body is rolling from side to side or moving vertically. The arrangement of the parts is such that a turning of the truck 2 causes a corresponding turning movement of the headlight 3, with the result that the light is thrown around a curve in advance of the car, whereby the operator can observe a safe distance ahead as well as admitting a person to observe the approach of the car, thereby giving ample warning so as to avoid a fatality.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claim appended hereto.

Having thus described the invention what is claimed as new, is:—

In a vehicle provided with a truck or like part mounted to turn about a vertical axis, a headlight mounted upon the vehicle to turn about a vertical axis, a toothed gear element connected with the headlight and comprising a plate having its rear edge curved and toothed concentric with the axis of the headlight, a longitudinal lever having toothed segments at opposite ends, the toothed segment at one end meshing with the toothed portion of the gear element connected with the headlight, and an arm projecting from the truck and having a toothed segment at its front end in mesh with the toothed segment at the rear end of the longitudinal lever, the toothed segment of said arm having flanges above and below the toothed portion thereof embracing opposite sides of the toothed segment at the rear end of the longitudinal lever.

In testimony whereof I affix my signature in presence of two witnesses.

JORDAN N. STONER.

Witnesses:
F. W. PORTER,
H. S. STONER.

Copies of this patent may be obtained for five cents each, by addressing the "Commissioner of Patents, Washington, D. C."